(12) United States Patent
Manzano

(10) Patent No.: US 6,409,018 B1
(45) Date of Patent: Jun. 25, 2002

(54) CADDY OF SHIRRED FOOD CASING STICKS

(75) Inventor: Alfonso Ricardo Suarez Manzano, Michoacan (MX)

(73) Assignee: Arteva North America S.A.R.L., Zurich (CH)

( * ) Notice: Subject to any disclaimer, the term of this patent is extended or adjusted under 35 U.S.C. 154(b) by 0 days.

(21) Appl. No.: 09/813,903

(22) Filed: Mar. 21, 2001

(51) Int. Cl.[7] ............................................. B65D 71/08
(52) U.S. Cl. ....................... 206/443; 206/497; 206/499; 206/802
(58) Field of Search ................. 53/442; 206/83.5, 206/443, 446, 499, 526, 802; 426/106, 129

(56) References Cited

U.S. PATENT DOCUMENTS

| | | | |
|---|---|---|---|
| 3,764,351 A | 10/1973 | Whittington | 206/46 F |
| 3,971,187 A | 7/1976 | McNeill | 53/21 FC |
| 4,076,622 A | 2/1978 | Costin | 210/64 |
| 5,137,153 A | 8/1992 | Hendriks | 206/443 |
| 5,228,572 A | 7/1993 | Hendriks | 206/443 |
| 5,356,007 A | 10/1994 | Feldt | |
| 5,381,643 A | 1/1995 | Kazaitis | 53/415 |
| 5,382,190 A | 1/1995 | Graves | 452/21 |
| 5,391,108 A | 2/1995 | Feldt | 452/21 |
| 5,467,576 A | 11/1995 | Hendriks | 53/437 |
| 5,727,364 A | 3/1998 | Artieda | 53/415 |
| 5,865,312 A | * 2/1999 | Stall | 206/43 |
| 5,975,301 A | 11/1999 | Stall | 206/446 |

FOREIGN PATENT DOCUMENTS

| | | |
|---|---|---|
| EP | 0696542 B1 | 4/1998 |
| EP | 0888976 A1 | 7/1999 |

* cited by examiner

*Primary Examiner*—Jim Foster
(74) *Attorney, Agent, or Firm*—Gregory N. Clements

(57) ABSTRACT

A caddy having a plurality of shirred food casing sticks arranged in a unique configuration therein that aids in achieving optimal utilization of available space for a plurality of caddies nested within a carton. A preferred embodiment of the present invention includes a caddy for packaging and transporting fifty sticks arranged in a semi-rectangular stick configuration having eight (8) generally adjacent and densely packed rows and a stacking of 6-7-6-7-6-7-6-5. The caddy mechanically interlocks with a second caddy via a series of recessed notches and protruding members. The snugness of the fit between the caddy and the second caddy is improved therefore enhancing stability and decreasing the amount of wasted space between adjacent caddies that are nested together.

16 Claims, 3 Drawing Sheets

CADDY OF SHIRRED FOOD CASING STICKS

BACKGROUND OF THE INVENTION

1) Field of the Invention

This invention relates generally to a caddy for packaging and transporting shirred food casing sticks, and more specifically to a caddy having a plurality of shirred food casing sticks arranged in a unique configuration therein.

2) Prior Art

Cellulose casings are used during the manufacture of sausages and frankfurters containing meat products, such as, beef, pork or poultry, or blends thereof. The cellulose casings are customarily long, continuous and tubular in length. The long and continuous tubular cellulose casings are shirred and longitudinally compressed onto a stick by known techniques to obtain shorter and relatively rigid tubular articles known in the industry as shirred food casing sticks. As a result, shirred food casing sticks (sticks) are substantially cylindrical in shape and substantially equal in length and diameter. Each of the plurality of sticks has a longitudinal axis, a first end, and a second end opposing the first end. The sticks are arranged in a plurality of generally adjacent packed rows having their longitudinal axes parallel, while the first end of each of the plurality of sticks are coplanar, and the second end of each of the plurality of sticks are coplanar. The sticks are then gathered into pleats nested against one another (shirring) and subsequently shipped to meat manufacturing facilities for stuffing.

During a stuffing procedure, the sticks are individually loaded onto a stuffing horn and a meat emulsion is fed through the horn and into a shirred food casing that is drawn forward from the stick by the stuffing pressure. It is not uncommon for a stick that is 50 centimeters long to contain upwards of 50 meters or more of shirred food casing.

A major disadvantage associated with the sticks having nested pleats is that the shirred food casings themselves are of cellulosic origin and are thus relatively fragile. That is, the shirred food casings are subject not only to undesirable pinhole damage resulting from lateral abrasion during shipping, but also undesirable dimensional changes such as curving, bowing and loss of stick coherency in which the pleats become un-nested and the sticks come apart. As a result, packaging of sticks must prevent undesirable pinhole damage as well as undesirable dimensional changes.

In commercial practice, it is generally customary to tightly bundle sticks together in quantities of fifty (50) with shrink wrap or stretch film (film). Bundling the sticks tightly together accomplishes two important protective functions. First, due to the sticks being tightly bound together, there is less likelihood of relative motion between the sticks, therefore preventing the sticks from rubbing against one another during shipping. As a result, undesirable pinhole damage caused by lateral abrasion during shipping of the shirred food casings is alleviated. Second, undesirable dimensional changes, such as curving, bowing, and loss of stick coherency, are avoided because the sticks are bound together in a tight bundle.

According to conventional practice, the tight bundle of fifty sticks is referred to as a caddy. Most sausage and frankfurter manufacturers prefer this conventional number of fifty sticks per caddy for ease of ordering and record keeping. Furthermore, multiple caddies are oftentimes packed together into a common carton or box made of rigid corrugated fiber board (cardboard). Typical cartons contain four (4), six (6) or eight (8) caddies.

Unfortunately however, a carton containing multiple caddies leaves empty or unused spaces between the caddies themselves and also between the caddies and the surrounding carton. These gaps of unused space are directly attributable to the specific shape of each caddy. Furthermore, the shape of each caddy is directly related to the specific configuration of the fifty sticks housed therein. Oftentimes, the amount of wasted space created between the caddies themselves and also between the caddies and the surrounding carton is quite substantial. This considerable amount of wasted space negatively influences storage and freight volumes by requiring additional amounts of space for the cartons, therefore imparting an undesirable impact on storage and shipping costs. Wasted space also negatively influences the manufacturing costs of the cartons themselves, as unnecessary additional amounts of cardboard is required. Additional amounts of cardboard subsequently increases the volume of waste generated, thus increasing recycling costs.

Because the gaps of unused space are directly attributable to the specific shape of each caddy, which in turn is directly related to the specific configuration of the fifty sticks housed therein, altering the configuration of the fifty sticks should provide an avenue for minimizing the amount of wasted space.

Several alternative stick configurations have been disclosed in the past. For example, U.S. Pat. No. 3,971,187 to McNeill and U.S. Pat. No. 5,727,364 to Artieda disclose a rectangular stick configuration having five (5) generally adjacent rows and a stacking of 10-10-10-10-10. Similarly, U.S. Pat. No. 5,382,190 to Graves discloses a rectangular stick configuration having ten (10) generally adjacent rows and a stacking of 5-5-5-5-5-5-5-5-5-5. On the other hand, U.S. Pat. No. 3,971,187 to McNeill, U.S. Pat. No. 5,381,643 to Kazaitis and U.S. Pat. No. 5,382,190 to Graves disclose a rectangular stick configuration having nine (9) generally adjacent and densely packed rows and a stacking of 6-5-6-5-6-5-6-5-6. It has been found that when a film is used for caddy packaging, the rectangular stick configuration of the caddy is unstable. This is attributable to the inward force exerted by the film in tension about each of the four corners of the caddy. Upon handling of the caddy, the four sticks, one stick located at each of the four corners of the caddy, have a tendency to be forced toward a circular configuration. Once the sticks along the corners of the caddy are displaced inward, tension is lost and the caddy becomes flaccid. This destroys the integrity of the caddy by eliminating the protection offered by bundling the sticks tightly together.

Various other alternative packaging arrangements have also been disclosed. For example, U.S. Pat. Nos. 5,137,153, 5,228,572 and 5,467,576 to Hendriks and U.S. Pat. No. 5,382,190 to Graves disclose an octagonal stick configuration having nine (9) generally adjacent and densely packed rows and a stacking of 4-5-6-7-6-7-6-5-4. Another alternative packaging arrangement is a hexagonal stick configuration having seven (7) generally adjacent and densely packed rows and a stacking of 7-8-9-8-7-6-5 as disclosed in U.S. Pat. No. 5,356,007, to Feldt, U.S. Pat. No. 5,381,643 to Kazaitis, U.S. Pat. No. 5,382,190 to Graves and U.S. Pat. No. 5,391,108 to Feldt. The octagonal stick configuration is unstable and can tip easily. The hexagonal stick configuration is a slight improvement over the octagonal stick configuration in that the hexagonal stick configuration is more stable and thus less likely to tip over. However, both the octagonal and the hexagonal stick configurations suffer from similar drawbacks in that a larger carton is required to contain four octagonal or hexagonal caddies, than is required to contain four conventional rectangular caddies.

Therefore, cardboard cartons of a larger surface area are necessary for containing four octagonal or hexagonal caddies as compared to cardboard cartons containing four rectangular caddies. As a result, storage, shipping, manufacturing, and recycling costs are detrimentally increased.

Another alternative packaging arrangement is a heptagonal stick configuration having seven (7) generally adjacent and densely packed rows and a stable stacking of 6-7-8-8-8-7-6 as disclosed in U.S. Pat. No. 5,975,301 to Stall. A key feature of Stall is that the fourth (4) row is slightly offset relative to its two adjacent rows, namely rows three (3) and five (5). As a result, the fourth (4) row has a protruding stick on one side and a recess on the opposite side. The protruding stick of one caddy readily fits into the recess of an adjacent caddy thus providing for a tighter more secure compaction between adjacent caddies. As a result, the amount of wasted space between adjacent caddies is slightly decreased. Therefore, four heptagonal caddies require a slightly smaller carton than is required for four octagonal or hexagonal caddies as previously described. Unfortunately however, the heptagonal caddies still require a larger carton than is necessary for four rectangular caddies. Although storage, shipping, manufacturing, and recycling costs for heptagonal caddies are slightly and beneficially decreased relative to cartons containing four octagonal or hexagonal caddies, the costs associated with heptagonal caddies still remains high relative to cartons containing rectangular caddies.

Therefore a need exists for a caddy having a plurality of shirred food casing sticks arranged in a unique configuration therein that decreases the amount of wasted space created between a plurality of caddies that are nested together and also between a plurality of caddies and a surrounding carton thus reducing storage, shipping, manufacturing, and recycling costs.

SUMMARY OF THE INVENTION

The present invention is a caddy having a plurality of shirred food casing sticks arranged in a unique configuration therein that decreases the amount of wasted space created between a plurality of caddies that are nested together and also between a plurality of caddies and a surrounding carton. The present invention is also a caddy having a plurality of sticks arranged in a unique configuration therein that aids in achieving optimal utilization of available space for a plurality of caddies nested within a carton thus reducing storage, shipping, manufacturing, and recycling costs.

A preferred embodiment of the present invention includes a caddy for packaging and transporting fifty sticks arranged in a semi-rectangular stick configuration having eight (8) generally adjacent and densely packed rows and a stacking of 6-7-6-7-6-7-6-5. A 6-7-6-7-6-7-6-5 stacking refers to a caddy having a first row that contains six sticks, a second row that contains seven sticks, a third row that contains six sticks, a fourth row that contains seven sticks, a fifth row that contains six sticks, a sixth row that contains seven sticks, a seventh row that contains six sticks, and an eighth row that contains five sticks.

A key feature of a caddy in accordance with the present invention is that a semi-rectangular stick configuration is stable, unlike the conventional rectangular stick configuration, which is unstable. As mentioned previously, the inward force exerted by a film in tension about each of the four ninety degree corners of a caddy having a rectangular stick configuration has a tendency to displace the four sticks, one stick located at each of the four corners, inward toward a flaccid circular configuration, thus destroying the integrity of the rectangular caddy. The present invention overcomes this deficiency in the prior art, while maintaining a semi-rectangular stick configuration, by eliminating the existence of ninety degree corners where inward forces exerted by the film are at their greatest. As a result, the integrity of the semi-rectangular caddy is upheld by more equally distributing the inward forces around the entire circumference of the semi-rectangular caddy.

A preferred embodiment of a pair of caddies, in accordance with the present invention, are coupled together by a series of recessed notches and protruding mating members. The first caddy is coupled with a second caddy. Once the first caddy is coupled with the second caddy, the pair of caddies are mechanically interlocked together. By mechanically interlocking the first caddy together with the second caddy, via a series of recessed notches and protruding mating members, the snugness of the fit between the first caddy and the second caddy is improved.

Because the snugness of the fit between the first caddy and the second caddy is improved, the stability between the first caddy and the second caddy is enhanced as they are held more tightly and securely together. Due to enhanced stability, the caddies are less likely to move during handling and transport thus correlating to a lesser amount of relative motion between the sticks. Therefore, the sticks are prevented from rubbing against one another during shipping. As a result, undesirable pinhole damage of the shirred food casings is alleviated. Furthermore, undesirable dimensional changes, such as curving, bowing, and loss of stick coherency, are also avoided.

Moreover, due to improved snugness between adjacent caddies, the semi-rectangular stick configuration of the present invention, provides for a decreased amount of wasted space between a plurality of caddies that are nested together. In addition, the semi-rectangular stick configuration, having eight (8) generally adjacent and densely packed rows and a stable stacking of 6-7-6-7-6-7-6-5, in accordance with the present invention, also provides for a decreased amount of wasted space between a plurality of caddies and a surrounding carton.

An essential feature of the present invention is that by achieving an optimal utilization of available space for a plurality of caddies nested within a carton, the volume of wasted space is decreased. Therefore a smaller carton is required, which causes the volume of waste generated from the cardboard packaging material to be lower. As a result, storage, shipping, manufacturing, and recycling costs are beneficially reduced.

BRIEF DESCRIPTION OF THE DRAWINGS

The foregoing and other objects will become more readily apparent by referring to the following detailed description and the appended drawings in which.

DETAILED DESCRIPTION

Figure 1:
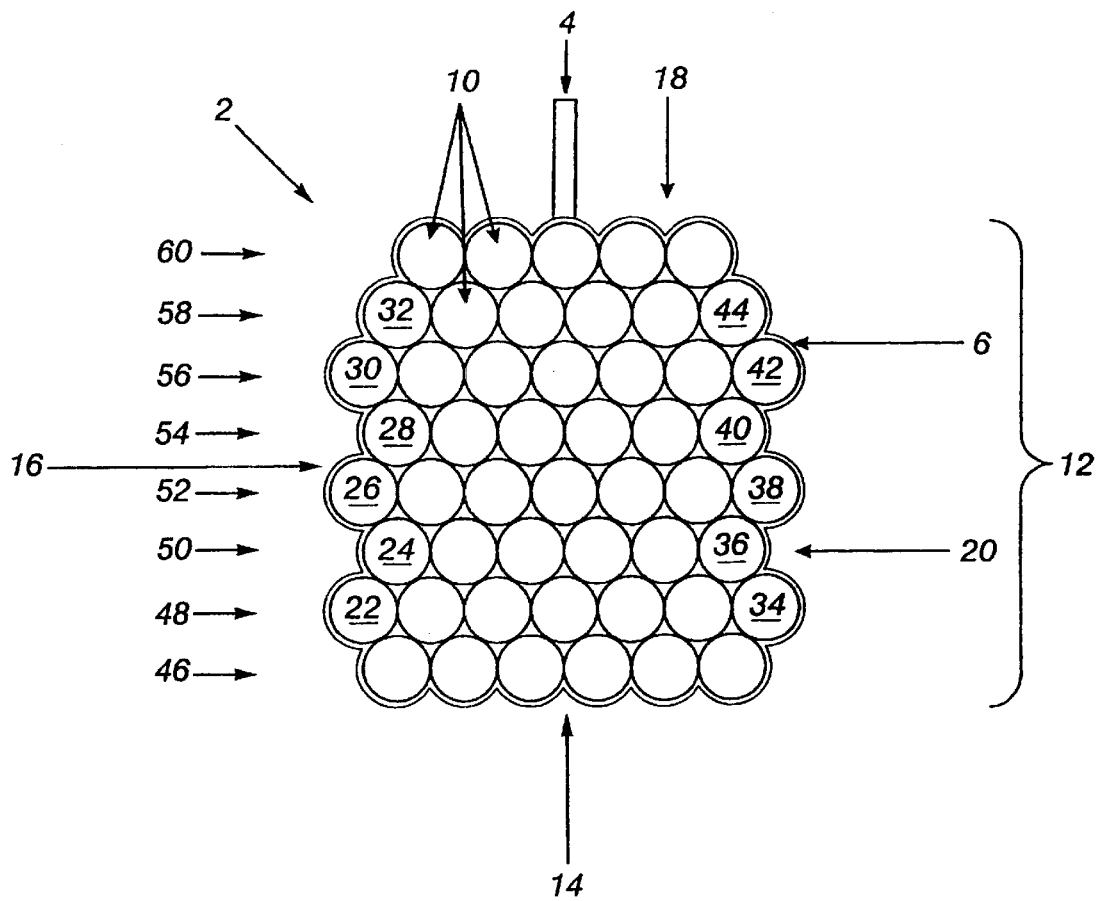
FIG. 1 schematically illustrates a preferred embodiment, in accordance with the present invention, of a semi-rectangular caddy for packaging and transporting fifty sticks arranged in a semi-rectangular stick configuration having eight (8) generally adjacent and densely packed rows and a stacking of 6-7-6-7-6-7-6-5.

FIG. 1 illustrates a preferred embodiment, in accordance with the present invention, of a semi-rectangular caddy for packaging and transporting fifty sticks arranged in a semi-rectangular stick configuration having eight (8) generally adjacent and densely packed rows and a stacking of 6-7-6-7-6-7-6-5.

The semi-rectangular caddy 2, in accordance with the present invention, has a handle 4 and a vacuum heat sealed peripheral shrink wrap 6 surrounding the caddy 2. The caddy 2 has a plurality of shirred food casing sticks 10 in a plurality of generally adjacent and densely packed rows 12.

The caddy 2 has a first stabilizing side 14, a first interlocking side 16, a second stabilizing side 18, and a second interlocking side 20. The first interlocking side 16 has a first, second, and third protruding members 22, 26, and 30, respectively, and first, second, and third recessed notches 24, 28, and 32, respectively. The second interlocking side 20 has a first, second, and third protruding members 34, 38, and 42, respectively, and first, second, and third recessed notches 36, 40, and 44, respectively.

The plurality of generally adjacent and densely packed rows 12 have a first row 46, a second row 48, a third row 50, a fourth row 52, a fifth row 54, a sixth row 56, a seventh row 58, and an eighth row 60. The first row 46 has six sticks and defines the first stabilizing side 14. The second row 48 has seven sticks and defines the first protruding member 22 of the first interlocking side 16, and also defines the first protruding member 34 of the second interlocking side 20. The third row 50 has six sticks and defines the first recessed notch 24 of the first interlocking side 16, and also defines the first recessed notch 36 of the second interlocking side 20. The fourth row 52 has seven sticks and defines the second protruding member 26 of the first interlocking side 16, and also defines the second protruding member 38 of the second interlocking side 20. The fifth row 54 has six sticks and defines the second recessed notch 28 of the first interlocking side 16, and also defines the second recessed notch 40 of the second interlocking side 20. The sixth row 56 has seven sticks and defines the third protruding member 30 of the first interlocking side 16, and also defines the third protruding member 42 of the second interlocking side 20. The seventh row 58 has six sticks and defines the third recessed notch 32 of the first interlocking side 16, and also defines the third recessed notch 44 of the second interlocking side 20. The eighth row 60 has five sticks and defines the second stabilizing side 20.

The vacuum heat sealed peripheral shrink wrap 6 surrounds the caddy 2 to thereby bundle the sticks 10 tightly together. The vacuum heat sealed peripheral shrink wrap 6 can be any stretchable and heat shrinkable film. Typical shrink wrap film may be produced from polyolefins, copolyolefins, or polyvinyl chloride, as is known in the industry. Polyolefin film is selected from the group consisting of polyethylene (PE), linear low density polyethylene (LLDPE), low density polyethylene (LDPE), high density polyethylene (HDPE), ultra high density polyethylene (UHDPE), or polypropylene (PP). Copolyolefin can comprise a mixture of any of the above. Also, nylon-adhesive-polyethylene film available as Fresh Pak 500 from Koch Supplies, Kansas City, Mo. makes a good shrink wrap.

Figure 2:
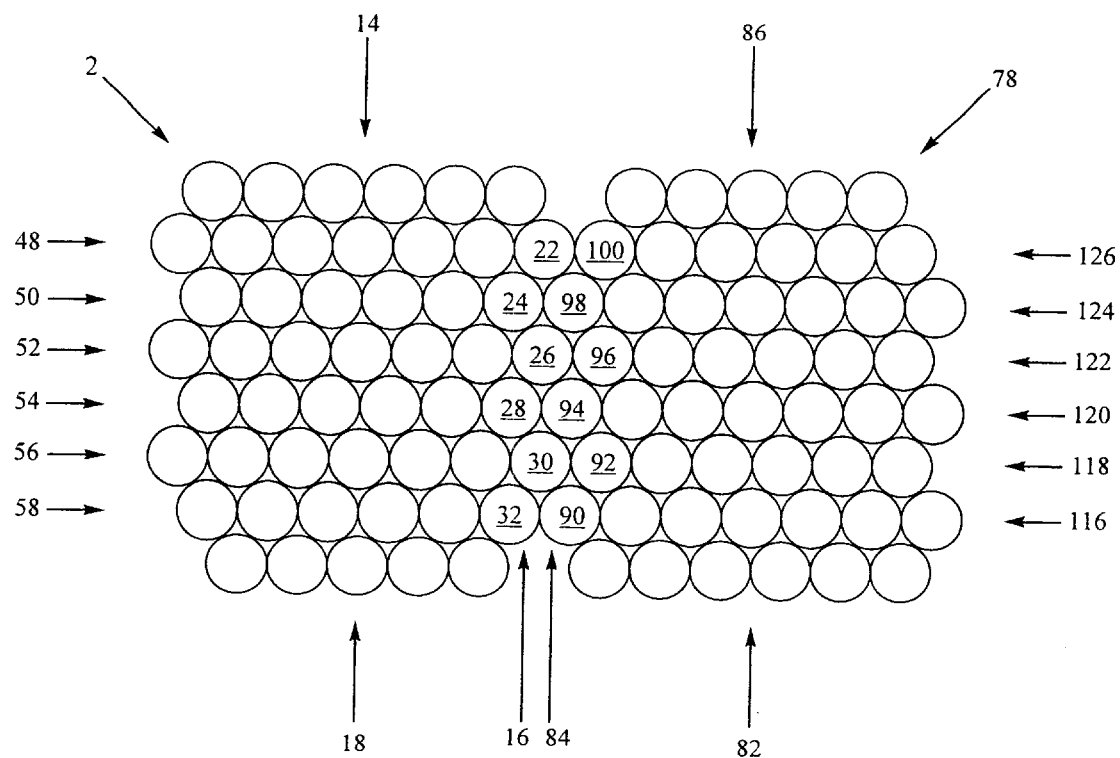
FIG. 2 schematically illustrates a preferred embodiment of a pair of caddies, mechanically interlocked by a series of recessed notches and protruding mating members.

FIG. 2 illustrates a preferred embodiment of a pair of caddies, in accordance with the present invention as shown in FIG. 1, coupled and mechanically interlocked together by a series of recessed notches and protruding members. As shown in FIG. 2, a first caddy 2 is coupled with a second caddy 78. The first caddy 2 is inverted relative to the second caddy 78. As a result, a first stabilizing side 14 of the first caddy 2 is coplanar with a second stabilizing side 86 of the second caddy 78, and a second stabilizing side 18 of the first caddy 2 is coplanar with a first stabilizing side 82 of the second caddy 78.

A first interlocking side 16 of the first caddy 2 mechanically interlocks with a first interlocking side 84 of the second caddy 78 via the following connections: a third recessed notch 32 of the first caddy 2 couples with a first protruding member 90 of the second caddy 78; a third protruding member 30 of the first caddy 2 couples with a first recessed notch 92 of the second caddy 78; a second recessed notch 28 of the first caddy 2 couples with a second protruding member 94 of the second caddy 78; a second protruding member 26 of the first caddy 2 couples with a second recessed notch 96 of the second caddy 78; a first recessed notch 24 of the first caddy 2 couples with a third protruding member 98 of the second caddy 78; and a first protruding member 22 of the first caddy 2 couples with a third recessed notch 100 of the second caddy 78.

Figure 3:
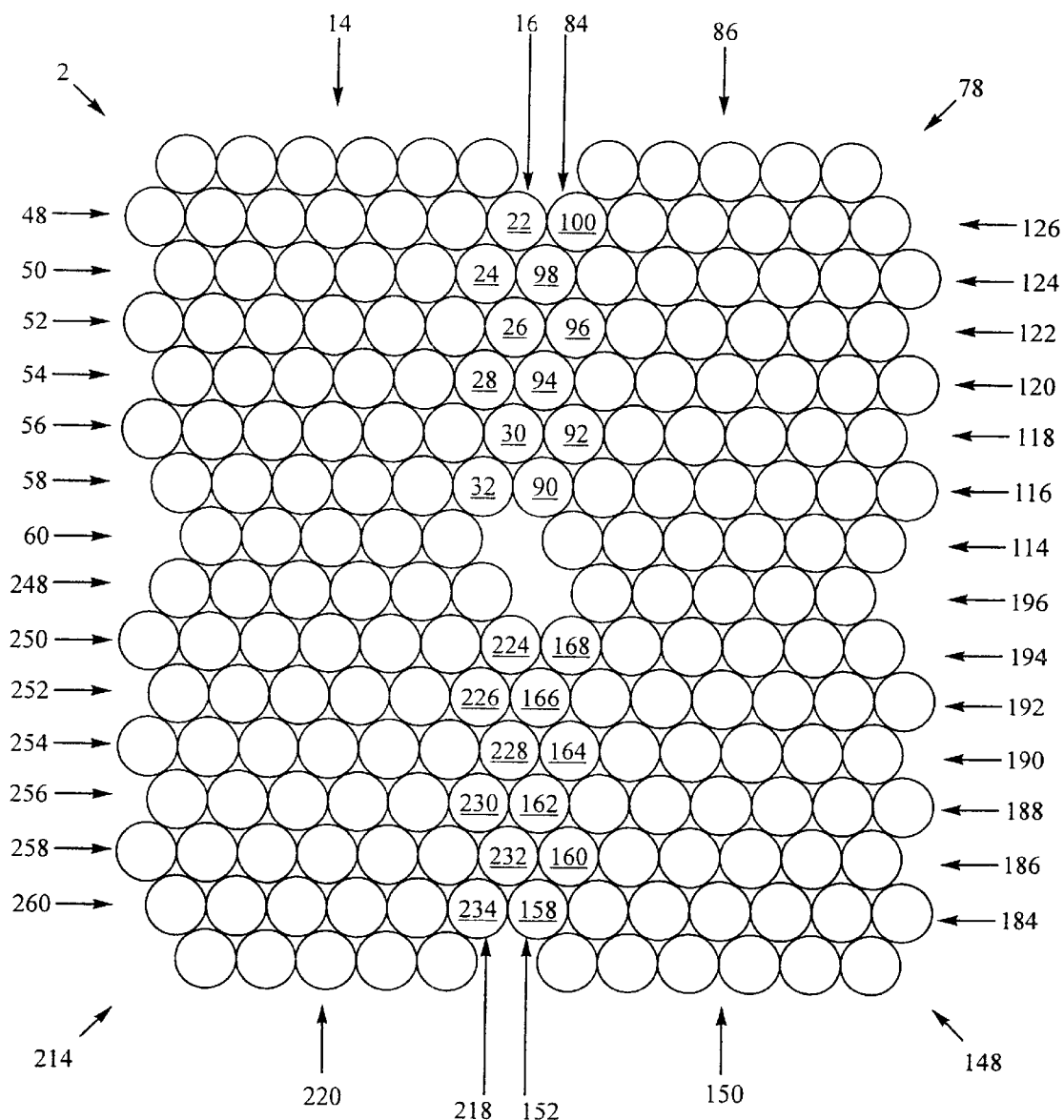
FIG. 3 schematically illustrates a preferred embodiment of a plurality of four caddies, mechanically interlocked by a series of recessed notches and protruding mating members.

FIG. 3 illustrates a preferred embodiment of a plurality of four caddies, in accordance with the present invention as shown in FIG.1, as they would be nested within a carton. As shown in FIG. 3, the first caddy 2 is inverted relative to the second caddy 78. The first caddy 2 mechanically interlocks with the second caddy 78. The fourth caddy 214 is inverted relative to the third caddy 148. The third caddy 148 mechanically interlocks with the fourth caddy 214.

The mechanical interlocking between the first caddy 2 and the second caddy 78 is similar to that described with respect to FIG. 2.

A first interlocking side 218 of the fourth caddy 214 mechanically interlocks with a first interlocking side 152 of the third caddy 148 via the following connections: a third recessed notch 234 of the fourth caddy 214 couples with a first protruding member 158 of the third caddy 148; a third protruding member 232 of the fourth caddy 214 couples with a first recessed notch 160 of the third caddy 148; a second recessed notch 230 of the fourth caddy 214 couples with a second protruding member 162 of the third caddy 148; a second protruding member 228 of the fourth caddy 214 couples with a second recessed notch 164 of the third caddy 148; a first recessed notch 226 of the fourth caddy 214 couples with a third protruding member 166 of the third caddy 148; and a first protruding member 224 of the fourth caddy 214 couples with a third recessed notch 168 of the third caddy 148.

Because the snugness of the fit between the first caddy 2 and the second caddy 78 as well as between the third caddy 148 and the fourth caddy 214 is improved, the stability between the first caddy 2 and the second caddy 78 as well as between the third caddy 148 and the fourth caddy 214 is enhanced as they are held more tightly and securely together. Due to enhanced stability, the caddies 2, 78, 148, 214 are less likely to move during handling and transport thus correlating to a lesser amount of relative motion between the sticks 10. Therefore, the sticks 10 are prevented from rubbing against one another during shipping. As a result, undesirable pinhole damage of the shirred food casings is alleviated. Furthermore, undesirable dimensional changes, such as curving, bowing, and loss of stick coherency, are also avoided.

Moreover, due to improved snugness between adjacent caddies 2, 78, 148, 214, the semi-rectangular stick configuration of the present invention, provides for a decreased amount of wasted space between a plurality of caddies 2, 78, 148, 214 that are nested together. In addition, the semi-rectangular stick configuration, having eight (8) generally adjacent and densely packed rows and a stacking of 6-7-6-7-6-7-6-5, also provides for a decreased amount of wasted spacel between the caddies 2, 78, 148, 214 and a surrounding carton 286. Because a smaller carton is required, the volume of waste generated from the cardboard packaging material is lower. As a result, storage, shipping, manufacturing, and recycling costs are beneficially reduced.

It is to be understood that the foregoing description and specific embodiments are merely illustrative of the best mode of the invention and the principles thereof, and that various modifications and additions may be made to the chemical composition by those skilled in the art, without departing from the spirit and scope of this invention, which is therefore understood to be limited only by the scope of the appended claims.

What is claimed is:

1. A caddy having a plurality of shirred food casing sticks arranged in a unique configuration, wherein said configuration comprises: a first row containing six of said shirred food casing sticks; a second row containing seven of said shirred food casing sticks; a third row containing six of said shirred food casing sticks; a fourth row containing seven of said shirred food casing sticks; a fifth row containing six of said shirred food casing sticks; a sixth row containing seven of said shirred food casing sticks; a seventh row containing six of said shirred food casing sticks; and an eighth row containing five of said shirred food casing sticks.

2. A caddy according to claim 1, wherein said configuration further comprises: a first stabilizing side; a first interlocking side; a second stabilizing side; and a second interlocking side.

3. A caddy according to claim 2, wherein said second stabilizing side of said configuration further comprises a handle.

4. A caddy according to claim 2, wherein said first interlocking side comprises: a first protruding member; a first recessed notch; a second protruding member; a second recessed notch; a third protruding member; and a third recessed notch.

5. A caddy according to claim 4, wherein said second interlocking side comprises: a first protruding member; a first recessed notch; a second protruding member; a second recessed notch; a third protruding member, and a third recessed notch.

6. A caddy according to claim 5, wherein said first row defines said first stabilizing side; said second row defines said first protruding member of said first interlocking side and also defines said first protruding member of said second interlocking side; said third row defines said first recessed notch of said first interlocking side and also defines said first recessed notch of said second interlocking side; said fourth row defines said second protruding member of said first interlocking side and also defines said second protruding member of said second interlocking side; said fifth row defines said second recessed notch of said first interlocking side and also defines said second recessed notch of said second interlocking side; said sixth row defines said third protruding member of said first interlocking side and also defines said third protruding member of said second interlocking side; said seventh row defines said third recessed notch of said first interlocking side and also defines said third recessed notch of said second interlocking side; and said eighth row defines said second stabilizing side.

7. A caddy according to claim 6, wherein said eight rows of said configuration are generally adjacent and densely packed.

8. A caddy according to claim 7, wherein said configuration further comprises a vacuum heat sealed peripheral shrink wrap surrounding said configuration to thereby bundle said shirred food casing sticks tightly together.

9. A caddy according to claim 8, wherein said vacuum heat sealed peripheral shrink wrap is a stretchable and heat shrinkable film, selected from the class of polyolefin, copolyolefin, polyvinyl chloride, or nylon-adhesive-polyethylene.

10. A caddy according to claim 9, wherein said polyolefin is selected from the group consisting of polyethylene (PE), linear low density polyethylene (LLDPE), low density polyethylene (LDPE), high density polyethylene (HDPE), ultra high density polyethylene (UHDPE), or polypropylene (PP).

11. A second caddy according to claim 10, said caddy inverted relative to said second caddy to form a pair of caddies.

12. A pair of said caddies according to claim 11, further comprising said first interlocking side of said caddy mechanically interlocked with said first interlocking side of said second caddy wherein said third recessed notch of said caddy couples with said first protruding member of said second caddy; said third protruding member of said caddy couples with said first recessed notch of said second caddy; said second recessed notch of said caddy couples with said second protruding member of said second caddy; said second protruding member of said caddy couples with said second recessed notch of said second caddy; said first recessed notch of said caddy couples with said third protruding member of said second caddy; and said first protruding member of said caddy couples with said third recessed notch of said second caddy.

13. A plurality of four caddies according to claim 10, said caddy inverted relative to said second caddy, and said fourth caddy inverted relative to said third caddy.

14. The plurality of four caddies according to claim 13, further comprising said first interlocking side of said caddy mechanically interlocked with said first interlocking side of said second caddy wherein said third recessed notch of said caddy couples with said first protruding member of said second caddy; said third protruding member of said caddy couples with said first recessed notch of said second caddy; said second recessed notch of said caddy couples with said second protruding member of said second caddy; said second protruding member of said caddy couples with said second recessed notch of said second caddy; said first recessed notch of said caddy couples with said third protruding member of said second caddy; and said first protruding member of said caddy couples with said third recessed notch of said second caddy.

15. The plurality of four caddies according to claim 14, further comprising said first interlocking side of said fourth caddy mechanically interlocked with said first interlocking side of said third caddy wherein said third recessed notch of said fourth caddy couples with said first protruding member of said third caddy; said third protruding member of said fourth caddy couples with said first recessed notch of said third caddy; said second recessed notch of said fourth caddy couples with said second protruding member of said third caddy; said second protruding member of said fourth caddy couples with said second recessed notch of said third caddy; said first recessed notch of said fourth caddy couples with said third protruding member of said third caddy; and said first protruding member of said fourth caddy couples with said third recessed notch of said third caddy.

16. The plurality of four caddies according to claim 15, nested together whereby said eighth row of said caddy is adjacent and densely packed relative to said first row of said fourth caddy; and said first row of said second caddy is adjacent and densely packed relative to said eighth row of said third caddy.

* * * * *